(12) United States Patent
Altounian

(10) Patent No.: US 6,525,162 B1
(45) Date of Patent: Feb. 25, 2003

(54) POLYOLS, POLYURETHANE SYSTEMS AND POLYURETHANE REACTIVE HOT MELT ADHESIVES PRODUCED THEREFROM

(75) Inventor: Georges Napoleon Altounian, Newark, DE (US)

(73) Assignee: Eastman Chemical Resins, Inc., Kingsport, TN (US)

( * ) Notice: Subject to any disclaimer, the term of this patent is extended or adjusted under 35 U.S.C. 154(b) by 0 days.

(21) Appl. No.: 09/592,521

(22) Filed: Jun. 12, 2000

Related U.S. Application Data (60) Provisional application No. 60/138,867, filed on Jun. 11, 1999.

(51) Int. Cl.$^7$ .............................................. C08G 18/36
(52) U.S. Cl. ...................... 528/81; 528/59; 528/74.5; 528/905; 528/295.5; 252/182.22; 252/182.28; 156/333.1; 530/215; 530/218
(58) Field of Search .................. 156/331.1; 252/182.22, 252/182.28; 528/59, 74.5, 905, 295.5, 81; 530/215, 218

(56) References Cited

U.S. PATENT DOCUMENTS

| | | | |
|---|---|---|---|
| 3,025,160 A | | 3/1962 | Bunge et al. .................... 96/1 |
| 3,644,229 A | * | 2/1972 | Butler et al. |
| 3,692,720 A | | 9/1972 | Sloan |
| 3,907,863 A | * | 9/1975 | Voss |
| 3,931,077 A | | 1/1976 | Uchigaki et al. |
| 4,254,228 A | * | 3/1981 | Kleinmann et al. |
| 4,368,316 A | | 1/1983 | Laddha et al. ........... 528/295.5 |
| 4,377,510 A | | 3/1983 | Ruckel et al. |
| 4,501,872 A | * | 2/1985 | Chang et al. ................. 528/18 |
| 4,693,846 A | | 9/1987 | Piccirilli et al. |
| 4,775,719 A | * | 10/1988 | Markevka et al. .......... 525/125 |
| 4,789,719 A | | 12/1988 | Altounian |
| 4,808,255 A | | 2/1989 | Markevka et al. |
| 4,820,368 A | | 4/1989 | Markevka et al. |
| 4,891,269 A | | 1/1990 | Markevka et al. |
| 4,975,523 A | | 12/1990 | Altounian |
| 5,155,180 A | | 10/1992 | Takeda et al. |
| 5,166,302 A | | 11/1992 | Werner et al. |
| 5,441,808 A | | 8/1995 | Anderson et al. |
| 5,599,895 A | | 2/1997 | Heider ......................... 528/59 |

FOREIGN PATENT DOCUMENTS

| | | |
|---|---|---|
| EP | 720996 | * 10/1996 |
| JP | 2107687(90) A | 4/1990 |
| JP | 04077582 | * 3/1992 |
| JP | 5214312(93) A | 8/1993 |
| JP | 93066425(93) | 9/1993 |
| JP | 10195413 | 7/1998 |

* cited by examiner

*Primary Examiner*—Rachel Gorr
(74) *Attorney, Agent, or Firm*—B. J. Beshears; Bernard J. Graves

(57) ABSTRACT

A new polyol family for the manufacture of novel polyurethane systems, preferably of polyurethane reactive hot melt adhesives is disclosed. The polyol(s) are reactive modifiers that enhance the properties of polyurethane systems. The inventive polyols are the reaction product of a monocarboxylic acid, a polycarboxylic acid and a polyhydric alcohol. The polyol of the present invention is used to produce urethane polymers, preferably polyurethane reactive hot melt adhesives by reacting the polyol with polyfunctional isocyanates. A method for producing the polyol, the urethane polymer as well as the polyurethane reactive hot melt adhesives is also provided.

49 Claims, 3 Drawing Sheets

POLYOLS, POLYURETHANE SYSTEMS AND POLYURETHANE REACTIVE HOT MELT ADHESIVES PRODUCED THEREFROM

This application claims benefit of U.S. Provisional Application 60/138,867, filed Jun. 11, 1999.

FIELD OF THE INVENTION

The present invention relates to polyols, urethane polymers comprising the polyols and reactive hot melt adhesive compositions comprising the urethane polymers and the process of making the polyols, urethane polymers and reactive hot melt adhesive compositions.

BACKGROUND OF THE INVENTION

In conventional hot melt adhesives, typically a polymer, a tackifier, and a selection of other additives such as antioxidants, are mixed together to produce an adhesive composition. These materials tend to form bonds through their rapid solidification from the melt. These materials have the advantage of being relatively easy to apply. However hot melt adhesives are typically not reactive in nature and therefore do not develop sufficient strength and sufficient heat and chemical resistance for certain applications.

In order to impart sufficient structural, heat and chemical resistance to adhesive formulations, reactive or curable compositions are conventionally used. These materials tend to form durable bonds through a chemical reaction and as such are the adhesives of choice for various applications and substrates. However, reactive or curable compositions are typically lacking in versatility on the combined property characteristics of "green" strength and "open" time. This lack of process versatility makes the compositions handling characteristics poor and limits the composition's utility in some assembly operations.

In polyurethane reactive hot melt adhesives (polyurethane Rhma), an isocyanate terminated urethane polymer is produced through the polymerization of polyols and excess polyisocyanate compounds.

Polyurethane Rhma(s) typically are cured in the presence of moisture. Moisture, which is present in the ambient atmosphere, reacts with the isocyanate end groups to cause chain extension and or crosslinking. As a result of this curing reaction, polyurethane Rhma develop temperature and chemical resistance. A typical cured polyurethane Rhma would generally exhibit a degree of stiffness as well as toughness. Toughness of polyurethane Rhma is attributed to long chain polyols called "soft segments". Stiffness of the polyurethane Rhma is attributed to relatively short chain, high Tg, regions called "hard segments".

Typically, polyurethane Rhma(s) do not exhibit sufficient combined green strength and open time for many manufacturing processes. Also, while moisture cured polyurethane Rhma exhibit good temperature resistance when compared to typical hot melt adhesives, a need exists for a polyurethane Rhma that exhibit a desirable balance of processing, thermal and mechanical attributes.

Those skilled in the art of formulating polyurethane Rhma(s) have used so-called "modifiers" in an attempt to improve the balance of processing, thermal and mechanical attributes of polyurethane Rhma(s). These conventional modifiers have included rosin glycerol ester, polycaprolactone diol and terpene phenolic resins. These modifiers have not provided a viable solution to the formulators' needs and hence a need still exists for a modifier that can provide a useful balance of processing, thermal and mechanical attributes to polyurethane Rhma(s).

BRIEF DESCRIPTION OF THE INVENTION

The present invention relates to new polyols, urethane polymers made from these polyols and reactive hot melt adhesive compositions which include the urethane polymers.

The present invention particularly relates to polyols comprising the reaction products of a polyesterification process employing monocarboxylic acids, polyhydric alcohols and dicarboxylic acids as reactants. The polyol of the present invention has a glass transition temperature (Tg) in the range of about −20° C. to about +45° C. as determined by Differential Scanning Calorimeter (DSC). Additionally, the polyol has a hydroxyl functionality ranging from 0.1 to 4.

The polyols of this invention have utility in polyurethane compositions and confer upon such compositions a desirable balance of processing, mechanical and thermal attributes, particularly when such compositions are used as reactive hot melt adhesives.

DETAILED DESCRIPTION OF THE INVENTION

The present invention relates to new polyols, new urethane polymers made from these polyols and reactive hot melt adhesive compositions based on the new urethane polymers. In one embodiment, the present invention particularly relates to polyester polyols which include the reaction products of a polyesterification process employing monocarboxylic acids, polyhydric alcohols and polycarboxylic acids as reactants.

The preferred monocarboxylic acid reactants are rosin acids including wood, gum and tall oil rosin acids. Particularly preferred rosin acids are tall oil rosin acids. The rosin acids may be a mixture of rosin acids obtained by a distillation process. Such distillates will comprise a mixture of various rosin acids including abietic acid and its isomers. A particularly preferred commercial source of such a distillate is Pamite™ 90 tall oil rosin available from Hercules Incorporated, Wilmington, Del. A hydrogenated or disproportionated rosin acid distillate may also be employed as the monocarboxylic acid component.

The monofunctional carboxylic acid reactant may be used in amounts of about 5% to about 70% of the total moles of reactants in the reaction product, more preferably in amounts of about 10% to about 50% of the total moles of reactants in the reaction product, and most preferably in amounts of about 20% to about 45% of the total moles of reactants in the reaction product.

Useful polyhydric alcohol reactants include aliphatic polyhydric alcohols and aliphatic ether polyhydric alcohols. For example, useful polyols include those which have the formula:

$$(HO)_xR$$

wherein x is 2, 3 or 4. If x is 2, such polyol is to be used in combination with another polyol where x is 3 or 4; and R may be a linear or branched aliphatic, a cycloaliphatic or an aliphatic ether.

The polyhydric alcohol reactants preferably have more than two hydroxyl functional groups per molecule. Particularly preferred are polyhydric alcohols having three or more hydroxyl functional groups per molecule. Preferred polyhydric alcohols include pentaerythritol cyclohexane dimethanol, trimethylol propane, dipropylene glycol, and combinations thereof. When the aliphatic polyol is a diol, such as cyclohexane dimethanol and dipropylene glycol, it is desirable that the moles of hydroxyl functionality provided by these aliphatic diol reactants do not exceed about twice the moles of hydroxyl functionality provided by these polyhydric alcohol reactant(s) having hydroxyl functionality greater than 2. The polyhydric alcohol reactant may be used in amounts of about 5% to about 50% of the total moles of reactants in the reaction product, more preferably in amounts of about 7.5% to about 45% of the total moles of reactants in the reaction product, and most preferably in amounts of about 10% to about 40% of the total moles of reactants in the reaction product.

In general, useful polycarboxylic acids include those having the structure:

HOOC—R—COOH where R is aliphatic or aromatic. For example, when R is a linear aliphatic —$(CH_2)_{1-10}$ the polycarboxylic acids included are propanedioic acid, butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), undecanedioic acid and dodecanedioic acid. Combinations of polycarboxylic are useful.

Additionally R may also be a branched aliphatic, a cycloaliphatic or a substituted aliphatic such as a halide substituted aliphatic. An example of a dicarboxylic acid reactant when R is a branched aliphatic is 2-methyl-1,6-hexanedioic acid. An example of a dicarboxylic acid reactant when R is a cycloaliphatic is 1,4-cyclohexanedioic acid. An example of a dicarboxylic acid reactant when R is a halide substituted aliphatic is 3,-Bromo-1,6-hexanedioic acid.

Additionally, R may be aromatic. Examples are 1,2-benzene dicarboxylic acid (phthalic acid), 1,3-benzene dicarboxylic acid (isophthalic acid) and 1,4-benzene dicarboxylic acid (terephthalic acid). When R is aromatic, the aromatic ring may also be halogen substituted.

Other aromatic dicarboxylic acids may also be employed. Examples include 2,7-naphthalene dicarboxylic acid and 4,4'-bisphenyl dicarboxylic acid.

The preferred polycarboxylic acid reactants have an acid functionality of about two and may be aliphatic or aromatic dicarboxylic acids. Preferred aliphatic dicarboxylic acids include adipic acid and preferred aromatic dicarboxylic acids include phthalic and isophthalic acids. Phthalic acid is preferably used as its anhydride. Particularly preferred are aliphatic dicarboxylic acids and especially adipic acid. When the particularly preferred aliphatic dicarboxylic acid, adipic acid, is utilized, aromatic dicarboxylic acids such as phthalic acid and isophthalic acids may be optionally and advantageously used as well in the reactant mixture provided the moles of aromatic dicarboxylic acid does not exceed about twice the moles of aliphatic dicarboxylic acid. The polycarboxylic acid reactant includes from about 5% to about 50% of the total moles of reactants in the reaction product, more preferably it includes from about 10% to about 42.5% of the total moles of reactants in the reaction product and most preferably it includes from about 15% to about 35% of the total moles of reactants in the reaction product.

The polyester polyols of this invention may conform to the formulation illustrated below:

$(R)_y$—P—$(OH)_x$ where P represents a linear or branched chain structure resulting from the polyesterification reaction of a polycarboxylic acid and a polyhydric alcohol; OH is a residual hydroxyl functionality derived from a polyhydric alcohol; x may vary from about 0.9 to about 4.0; R is a rosin acid residue; y can be zero or higher and both OH and R may exist at chain ends and/or at terminal branch points along the chain.

One possible structure of a polyester polyol made in accordance with the present invention which conforms to the general formula above is described by the following formula:

with R=

In this specific example, x=2, y=4, and P is a linear chain structure resulting from the polyesterification reaction of adipic acid, pentaerythritol and trimethylol propane.

The polyester polyols made in accordance with the present invention have a glass transition temperature (Tg) in a range between about −20° C. and about +45° C. as determined by Differential Scanning Calorimeter (DSC). Preferably, the polyester polyol has a glass transition temperature in a range between about −15° C. and about +40° C., and most preferably the polyester polyol has a glass transition temperature in a range between about −10° C. and about +35° C.

The polyester polyol of the invention has a melt viscosity measured at 120 degrees Centigrade with a Brookfield viscometer that preferably ranges between 100 centipoise and 20,000 centipoise and more preferably ranges between 200 centipoise and 10,000 centipoise.

In the polyester polyol made in accordance with the present invention, it is advantageous to limit its moisture content. It is preferred that the moisture content of the polyester polyol be less than about 2% by weight absorbed water as determined by Karl Fisher titration. Preferably, the moisture content of the polyester polyol be less than about 1% by weight, more preferably less than about 0. 1% by weight, absorbed water as determined by Karl Fischer titration.

The polyester polyols made in accordance with the present invention have resin acids incorporated therein through an esterification reaction. It is believed that the rosin acid brings advantages to the polyol of the present invention. First, the rosin's monocarboxylic acid controls the hydroxyl functionality of the polyol, which allows use of polyhydric alcohols such as pentaerythritol, and improves structural performance of the adhesive. Second, the rosin may serve to increase the glass transition temperature. Moreover, presence of the rosin in combination with the other components used to make the polyol enhances the peel strength of adhesives made therefrom. For example, incorporation of an effective amount of the polyols made in accordance with the present invention into a urethane adhesive enhances such physical properties as modulus, elongation, tensile strength and heat resistance.

The inventive polyester polyols may be produced by a number of polyesterification processes well known to those skilled in the art. Particularly preferred are melt polyesterification processes employing small amounts of solvents that form azeotropes with water to aid in its removal from the reaction system. The polyesterification process may be conducted in one stage or in two or more stages. Particularly preferred processes employ two stages. The examples illustrate processes by which the inventive polyester polyols may be readily produced.

The polyester polyols of the present invention may be used in the manufacture of moisture curable urethane polymers or in the manufacture of multiple component polyurethane systems. The moisture curable urethane polymers comprising the polyester polyols of the present invention may be used as components in polyurethane reactive hot melt adhesives and sealants. Alternatively, the polyester polyols of the present invention may be used with multiple component systems to produce casting elastomers, sealants, optical products and composite structures.

The inventive urethane polymers are prepared by reacting the inventive polyester polyol with an excess amount of a polyfunctional isocyanate for a period of time sufficient to provide reaction between the reactive hydroxyl groups of the polyester polyol and the isocyanate group(s) of the polyfunctional isocyanate, while retaining an amount of residual isocyanate functionality such as taught in U.S. Pat. No. 4,975,523, incorporated herein by reference in its entirety. The urethane polymer will preferably have from 1.5% to 2.5% by weight residual isocyanate functionality and more preferably will have about 2% by weight residual isocyanate functionality. The inventive polyester polyols may be mixed with conventional polyester and polyether polyols commonly used to produce urethane polymers. Representative of conventional polyester polyols are those supplied by Creanova Inc. under the tradename Dynacol™ and representative of conventional polyether polyols are those supplied by ARCO Chemical Company under the tradename ARCOL™. Blends which include the inventive polyester polyols, as well as conventional polyester polyols and or polyether polyols, are reacted with an excess amount of polyfunctional isocyanate to produce the isocyanate functional urethane polymers. In such instances, the inventive urethane polymers include the inventive polyester polyols in amounts of about 10% to about 80% of the urethane polymer by weight, more preferably from about 10% to 60% of the urethane polymer by weight and most preferably from about 10% to 30% of the urethane polymer by weight.

Polyfunctional isocyanates of use in forming the new urethane compositions of the present invention may be aliphatic or aromatic isocyanates. Useful polyfunctional isocyanates include alkane diisocyanates such as ethylene diisocyanate; trimethylene diisocyanate and hexamethylene diisocyanate; alkene diisocyanates such as 1-propylene-1,2-diisocyanate and 1-butylene-1,3-diisocyanate; alkylidene diisocyanates such as ethylidene diisocyanate, isophorone diisocyanate and propylidene-1,1-diisocyanate; aromatic diisocyanates such as m-phenyl-diisocyanate; 2,4 toluene diisocyanate, 2,6-toluene diisocyanate, 4,4' diphenyl methane diisocyanate and other polyfunctional isocyanates such as polymethylene polyphenyl isocyanate and the like. A preferred polyfunctional isocyanate is 4,4' diphenyl methane diisocyanate.

The urethane polymers of the present invention may also be combined with conventional urethane polymers and or other polymers such as EVA, SBS, SIS, polyolefins, polyacrylates, and or other thermoplastic or elastomeric polymers to produce urethane polymer blends.

The isocyanate functional urethane polymers of this invention and or their blends with conventional isocyanate functional urethane polymers and or other thermoplastic and or elastomeric polymers may be used advantageously as moisture curable adhesives with excellent physical properties, including improved heat resistance. The inventive polyurethane Rhma(s) display a heretofore unattainable balance of processing, mechanical and thermal properties. Particularly surprising and beneficial is the ability of the inventive polyurethane Rhma to attain Shear Adhesion Failure Temperatures in excess of 200 degrees Centigrade.

Adhesives of the present invention are of use in many end uses, particularly in assembly operations. Among the assembly operations are transportation uses such as; carpet bonding, door panels, instrument panel assembly, recreation vehicles, over the road trailers, heavy-duty trucks and marine uses. Also among the assembly operations that adhesives of the present invention are of use in construction uses such as; window assembly, garage door assembly and structural insulated panels. Also among the assembly operations that adhesives of the present invention are of use in other assembly applications such as; shoe soles, non-wovens, and profile wrapping including edge banding.

The present invention will be further illustrated by way of the following examples.

EXAMPLES

METHODS AND DEFINITIONS

Green Strength (Set Time)

Green Strength is the amount of close time required to hold a tensile load of 4.5 Kg for at least 2 minutes. The procedure for determining a sample's Green Strength is as follows. A sample is heated in a container until the sample's temperature reaches 105° C. One half of a gram of the heated sample is evenly applied over an area of one square inch (1 in 2) of Douglas Fir plywood. After ten seconds (10 sec.), a second piece of Douglas Fir plywood is applied at right angles to the first piece of Douglas Fir plywood. Then the 4.5 Kg. load is applied at various times after the second piece of Douglas Fir plywood has been applied to determine the minimal time needed for the sample to hold the 4.5 Kg. load for a minimum of two minutes. This minimal time is the sample's Set Time and is a determination of the sample's Green Strength.

Shear Adhesion Failure Temperature (SAFT)

A one-inch wide adhesive strip is placed on a 6-inch wide substrate panel at 120° C. so that there is one square inch of contact with the panel and a length of adhesive strip overhang at the bottom of the panel. One square inch of the adhesive strip is bonded to the substrate using a 10-lb. weight applied to the specimen for 15 minutes. The specimens are post-cured in a controlled humidity chamber at 85° C. and 65% relative humidity for 3.5 hours. The specimens are removed from the chamber and stored at 21° C. and 45% relative humidity for 12 hours. The bonded panel is placed in a rig so that the back of the panel is at a 2° angle with the vertical axis, allowing no peel forces to act on the adhesive bond when a one kilogram weight is hung on the unbonded end of the adhesive strip. The rig is placed in a forced air oven and the temperature is ramped up from ambient at 20° C. per hour. The temperature at which the bond fails is recorded. Eight specimens are run for each adhesive and the mean failure temperature is recorded.

Size Exclusion Chromatography

Size Exclusion Chromatography was preformed using a Waters 590 system with differential refractive index (Hewlett-Packard model 1047A) detection. The mobile phase employed was stabilized (BHT) tetrahydrofuran (Burdick & Jackson). A flow rate of .1.0 ml/min. was used. Waters/Millipore UltraStyragel column set (500+500+1000+100 Angstrom pore-size) was used. All molecular weight data reported above are based on a polystyrene calibration curve. All samples were filtered through a 0.45 $\mu$m PTFE membrane filter prior to analysis.

Differential Scanning Calorimetry

Differential Scanning Calorimetry was performed using a TH910 ROBOTIC DSC with LNCA in an open aluminum pan in a nitrogen atmosphere, using the following temperature program. A typical DSC thermogram plots heat flow as a function of temperature (or time in the case of an isothermal experiment). The sample is cooled to −60° C. and hold for five minutes. Then the specimen is heated from −60° C. to +120° C. at 10° C./minute and held at 120° C. for one minute. Then the specimen is cooled from 120° C. to −60° C. at 10° C./minute and held at −60° C. for five minutes. Then a second heat cycle is applied. The specimen is reheated from −60° C. to 120° C. at 10° C./minute.

When using a DSC to determine a glass transition temperature, a melting point, or the heat of fusion, two heating of the sample are commonly performed with the desired information being determined from the second heating. The first heating is used to impose a known thermal history on the sample. The first heating erases thermal stresses in the sample which can give rise to sporadic peaks, can conform the sample to the sample pan which provides better instrument response, and can remove residual volatiles or moisture which can confuse the interpretation of the DSC results.

180° C. Peel Test Between a Cotton Duck Canvas and the Testing Substrate

The Reactive Hot Melt Adhesives were tested on 1"×6" substrate panels (polycarbonate, aluminum, steel, stainless steel and EPDM). The polycarbonate and EPDM panels were wiped with isopropanol while the metal substrates were cleaned with toluene; all were air-dried for at least fifteen minutes prior to the adhesive application. The metal substrates were heated to 120° C. prior to the adhesive application while the polymer substrates were used at room temperature. The Reactive Hot Melt Adhesives were melted in a Meltex® PUR 201, from Nortson Corporation, at 120° C. The adhesive was applied to the substrate, and the canvas was localized on top of the adhesive. The adhesive strip was bonded to the substrate using a 4.5 lb. mechanical rolldown device from Chemsultants International, which is applied on the canvas. The specimens are stored at room temperature and 45% relative humidity for 7 days. The canvas was then peeled from the tested substrate at a 180° angle in a universal testing machine. The force necessary to break the bond is measured. The bond area was visually evaluated for the type of failure.

Tensile Testing of the Reactive Hot Melt Adhesives

The testing machine is an Instron Model number 4201. The capacity of the load cell is 500 Newtons. Sheets of polyurethane hot melt adhesive were prepared by dosing several grams of the adhesive from the Meltex® PUR201 applicator onto a PTFE film placed on top of a heated metal plate (100° C). 0.010 inch shims were placed along the edges of the PTFE film. The adhesive was covered with another PTFE film and another heated plate. The sandwich was then placed in a press and pressure applied (25 pounds per square inch) for one minute. The thickness of the specimen was measured after the specimens had been cut into 0.5-inch wide strips for tensile testing. Tensile tests were performed after conditioning the cured samples at room temperature and 45% relative humidity for seven days. The crosshead speed was 2.00 inch/minute. The gauge length was 0.5 inches.

Adhesive Bonding Testing System (Open Time)

The Adhesive bond testing system Model 106PC is used. Olinger Company produces the equipment. The Olinger Bond Tester doses the hot melt adhesive onto a substrate (Polycarbonate), then presses a second substrate onto the adhesive and induces a pull force on the sandwich. The following parameters were controlled during the test:

a.) The Open Time, which is the time between dosing the adhesive to the first substrate and the application of the second substrate.

b.) The Close Time, which is the time between the application of the second substrate and the breaking of the bond.

c.) The adhesive temperature d.) The Hopper Pressure e.) The Sample compression force.

The temperature, the Open time and the Close time are nominally programmable, while pressures are readily adjustable with individual regulators. The force required to break the bond is measured and a visual observation of the bond failure is manually recorded.

When the Open time was performed, the close time was held constant (10 seconds) and the open time was varied.

Testing of the Moisture Content of the Polyols

The AQUATEST® 8 tester from PHOTOVOLT was used to determine the amount of moisture in the samples. It is a coulometric moisture analysis system (pyridine free). The Photovolt Aquatest 8 tester is a Karl Fisher coulometric titrator for the determination of water.

The mechanism of determination substantially similar to that of the Karl Fisher pyridine-based reagent. Water reacts quantitatively with iodine and sulfur dioxide generating hydrogen and sulfur trioxide.

Hydroxyl Number

The hydroxyl number of the materials was determined using ASTM E 222-73, standard test method entitled, "Hydroxyl Groups by Acetic Anhydride Acetylation", Method B.

Percentage Isocyanate

The percentage of available isocyanate in the materials was determined using ASTM D 4665-87, standard test method entitled, "Polyurethane Raw Materials: Determination of Assay of Isocyanates".

Acid Number

The acid number of materials was determined using ASTM D 4662-87, standard test method entitled, "Polyurethane Raw Materials: Determination of Acid and Alkalinity Numbers of Polyols".

Viscosity

The viscosity of the polyester polyols was measured with a Brookfield viscometer at 120 degrees Centigrade.

Example 1

The reactor used to produce polyols of the present invention consisted of a 5000 ml flask provided with five tubular inlets and a supply of nitrogen. The reactor was also provided with a mechanical stirrer, a condenser, a packing column, a water trap, an overflow nitrogen bubbler and an overhead nitrogen bubbler.

A reaction mixture of 179.32 g (1.23 moles) of adipic acid, 1220.12 g (3.83 moles) of Pamite® 90 tall oil rosin (available from Hercules Incorporated) and 261.03 g (1.92 moles) of pentaerythritol and 100 ml of toluene was introduced into the reactor. The reaction mixture was kept under inert atmosphere (nitrogen), stirred, heated and nitrogen sparged (135 cc/minute). At 114° C., the toluene reflux started, the riser temperature was at 84° C. and the water of reaction was collected. The refractive index of the water was 1.3325 after 10 minutes of reaction. The heating of the reaction mixture was continued until the temperature reached 276° C. When about 95% of the water was distilled, i.e. 86.6 ml, the reactor was cooled to 170° C., while maintaining the reaction mixture under inert atmosphere. The reaction time of the first stage equaled about five hours. The refractive index of water at the end of the first stage equaled to 1.3325. The temperature at the packing column equaled to 106° C.

1220.12 g (3.83 moles) of Pamite® 90 tall oil rosin, 381.05 g (2.61 moles) of adipic acid, 514.54 g (3.83 moles) of trimethylol propane and 30 ml of toluene were then added to the reactor, which was then reheated. When the temperature reached about 148° C., the water of reaction started to distill. The heating was continued until the theoretical amount of the water of reaction was removed. Monitoring of the acid value of the resin and the refractive index of water was taken every thirty minutes, until the acid value was below 3. The hydroxyl number was then measured. When the polyester polyol reached both a desired acid value and hydroxyl number, the reaction mixture was stripped of the toluene using a nitrogen sparging at a rate of 2 standard liter/minute (or vacuum strip) for 2 hours, until the concentration of toluene in solution was below 100 ppm.

The reactor was cooled down to 180° C. and the resultant polyester polyol was discharged in a clean dry, nitrogen purged and blanketed steel container. 3500 g of polyester polyol was prepared. The maximum polymerization temperature was 280° C. The total time required for this polycondensation reaction was 20.5 hours.

The polyester polyol had a theoretical functionality of 2.0 and an actual functionality of 2.1, a hydroxyl number of 58.4, and acid value of 2.9, a Gardner color of 9, a moisture content of 0.04%, a viscosity @ 120° C. of 8300 cps and a glass transition temperature of +30° C.

Example 2

The reactor used to produce polyols of the present invention consisted of a 5000 ml flask provided with five tubular inlets and a supply of nitrogen. The reactor was also provided with a mechanical stirrer, a condenser, a packing column, a water trap, an overflow nitrogen bubbler and an overhead nitrogen bubbler.

A reaction mixture of 35.5 g (2.30 moles) of adipic acid, 98.6 g (0.73 moles) of dipropylene glycol, 556.3 g (3.86 moles) of cyclohexanedimethanol and 100 ml of xylene was introduced into the reactor. The reaction mixture was kept under an inert atmosphere (nitrogen), stirred, heated and nitrogen sparged (135cc/minute). When the reaction mixture reached 152° C., the xylene reflux started, the riser temperature was at 92° C. and the water of reaction was collected. The refractive index of the water was 1.3333 after 10 minutes of reaction. The reaction mixture was heated until the temperature of the mixture reached 219° C. When about 95% of the water was distilled, i.e. 78.6 ml, the reactor was cooled to 170° C., while the reaction mixture was maintained under an inert atmosphere. The reaction time of the first stage was about two hours. The refractive index of water at the end of the first stage was 1.3354. The temperature at the packing column was 123° C.

1461.25 g (4.59 moles) of Pamite® 90 tall oil rosin, 680.2 g (4.59 moles) of phthalic anhydride, 616.23 g (4.59 moles) of trimethylol propane and 30 ml of xylene were then added to the reactor, which was then reheated. When the temperature reached about 163° C., the water of reaction started to distill. The reaction mixture was heated until the theoretical amount of the water of reaction was removed. The acid value of the resin and the refractive index of water were monitored every thirty minutes, until the acid value is below 3. The hydroxyl number was then measured. When the polyester polyol reached both the desired acid value and hydroxyl number, the reaction mixture was stripped of the xylene with a nitrogen sparging at a rate of 2 standard liter/minute (or vacuum strip) for 2 hours, until the concentration of xylene in solution was below 100 ppm. The reactor was cooled down to 180° C. and the resultant polyester polyol was discharged in a clean dry, nitrogen purged and blanketed steel container. 3500 g of polyester polyol was prepared. The maximum polymerization temperature was 280° C. The total time required for this polycondensation reaction was 18.7 hours.

This polyester polyol has a theoretical functionality of 2.0 and an actual functionality of 2.1, a hydroxyl number of 50, and acid value of 2.9, a color Gardner of 8, a moisture content of 0.04%, a viscosity @ 120° C. of 8000 cps and a glass transition temperature of +27° C.

Example 3

The reactor used to produce polyols of the present invention consisted of a 5000 ml flask provided with five tubular inlets and a supply of nitrogen. The reactor was also provided with a mechanical stirrer, a condenser, a packing column, a water trap, an overflow nitrogen bubbler and an overhead nitrogen bubbler.

A reaction mixture of 162.32 g (1.11 moles) of adipic acid, 305.54 g (2.06 moles) of phthalic anhydride, 58.58 g (0.35 moles) of isophthalic acid, 946.36 g (7.05 moles) of trimethylol propane and 100 ml of toluene was introduced into the reactor. The reaction mixture was kept under an inert atmosphere (nitrogen), stirred, heated and nitrogen sparged (135cc/minute). At 128° C., the toluene reflux started, the riser temperature was at 99° C. and the water of reaction was collected. The refractive index of the water was 1.3333 after 10 minutes of reaction.

The reaction mixture was heated until the temperature reached 232° C. When about 95% of the water was distilled, i.e. 85.4 ml, the reactor was cooled to 170° C., while maintaining the reaction mixture under inert atmosphere. The reaction time of the first stage equaled about two hours. The refractive index of water at the end of the first stage equaled to 1.3351. The temperature at the packing column equaled to 108° C.

2244.07 g (7.05 moles) of Pamite® 90 tall oil rosin and 30 ml of toluene were then added to the reactor, which was then reheated. When the temperature reached about 186° C., the water of reaction started to distill. The reaction mixture was heated until the theoretical amount of the water of reaction was removed. The acid value of the resin and the refractive index of water were monitored every thirty minutes, until the acid value was below 3. The hydroxyl number was then measured. When the polyester polyol reached both the desired acid value and hydroxyl number, the reaction mixture was stripped of the toluene with a nitrogen sparging at a rate of 2 standard liter/minute (or vacuum strip) for 2 hours, until the concentration of toluene in solution was below 100 ppm. The reactor was cooled down to 180° C. and the resultant polyester polyol was discharged in a clean dry, nitrogen purged and blanketed steel container.

3500 g of polyester polyol was prepared. The maximum polymerization temperature was 280° C. The total time required for this polycondensation reaction was 20.3 hours.

This polyester had a theoretical functionality of 2.0 and an actual functionality of 2.1, a hydroxyl number of 69.5, and acid value of 2.1, a color Gardner of 8, a moisture content of 0.04%, a viscosity @ 120° C. of 5775 cps and a glass transition temperature of +32° C.

Example 4

The reactor used to produce polyols of the present invention consisted of a 5000 ml flask provided with five tubular inlets and a supply of nitrogen. The reactor was also provided with a mechanical stirrer, a condenser, a packing column, a water trap, an overflow nitrogen bubbler and an overhead nitrogen bubbler.

A reaction mixture of 1173.85 g (8.03 moles) of adipic acid, 129.34 g (0.96 moles) of dipropylene glycol, 1019 9 (7.07 moles) of cyclohexanedimethanol, and 100 ml of xylene was introduced into the reactor. The reaction mixture was kept under inert atmosphere (nitrogen), stirred, heated and nitrogen sparged (135 cc/minute). At 147° C., the xylene reflux started, the riser temperature was at 90° C. and the water of reaction was collected. The refractive index of the water was 1.3333 after 10 minutes of reaction. The reaction mixture was heated until the temperature reached 207° C. When about 95% of the water was distilled, i.e. 275 ml, the reactor was cooled to 170° C., while maintaining the reaction mixture under inert atmosphere. The reaction time of the first stage was about four hours. The refractive index of water at the end of the first stage was 1.3376. The temperature at the packing column of the reactor was 120° C.

1703.94 g (5.35 moles) of Pamite®) 90 tall oil rosin, 359.39 g (2.68 moles) of trimethylol propane and 30 ml of xylene were then added to the reactor, which was then reheated. When the temperature reached about 199° C., the water of reaction started to distill. The reaction mixture was heated until the theoretical amount of the water of reaction was removed. The acid value of the resin and the refractive index of water were monitored every thirty minutes, until the acid value was below 3. The hydroxyl number was then measured. When the polyester polyol reached both the desired acid value and hydroxyl number, the reaction mixture was stripped of the xylene with a nitrogen sparging at a rate of 2 standard liter/minute (or vacuum strip) for 2 hours, until the concentration of xylene was below 100 ppm. The reactor was cooled down to 1 80° C. and the resultant polyester polyol was discharged in a clean dry, nitrogen purged and blanketed steel container. 4000 g of polyester polyol was prepared. The maximum polymerization temperature was 280° C. The total time required for this polycondensation reaction was 31 hours.

This polyester has a theoretical functionality of 1.0 and an actual functionality of 1.1, a hydroxyl number of 33, and acid value of 2.9, a color Gardner of 4, a moisture content of 0.04%, a viscosity @ 120° C. of 300 cps and a glass transition temperature of −3° C.

Example 5

The reactor used to produce polyols of the present invention consisted of a 5000 ml flask provided with five tubular inlets and a supply of nitrogen. The reactor was also provided with a mechanical stirrer, a condenser, a packing column, a water trap, an overflow nitrogen bubbler and an overhead nitrogen bubbler.

A reaction mixture of 1181.46 g (8.08 moles) of adipic acid, 115.72 g (0.86 moles) of dipropylene glycol, 652.88 g (4.53 moles) of cyclohexanedimethanol, and 100 ml of toluene was introduced into the reactor. The reaction mixture was kept under inert atmosphere (nitrogen), stirred, heated and nitrogen sparged (135 cc/minute). At 121° C., the toluene reflux started, the riser temperature was at 84° C. and the water of reaction was collected. The refractive index of the water was 1.3334 after 10 minutes of reaction. The reaction mixture was heated until the temperature reached 190° C. When about 95% of the water was distilled, i.e. 185 ml, the reactor was cooled to 170° C., while maintaining the reaction mixture under inert atmosphere. The reaction time of the first stage was about four hours. The refractive index of water at the end of the first stage was 1.3340. The temperature at the packing column was 114° C.

1714.98 g (5.39 moles) of Pamite® 90 tall oil rosin, 723.23 g (5.39 moles) of trimethylol propane and 30 ml of toluene were then added to the reactor, which was then reheated. When the temperature reached about 166° C., the water of reaction started to distill. The reaction mixture is heated until the theoretical amount of the water of reaction was removed. The acid value of the resin and the refractive index of water were monitored every thirty minutes, until the acid value was below 3. The hydroxyl number was then measured. When the polyester polyol reached both the desired acid value and hydroxyl number, the reaction mixture was stripped of the toluene with a nitrogen sparging at a rate of 2 standard liter/minute (or vacuum strip) for 2 hours, until the concentration of toluene was below 100 ppm. The reactor was cooled down to 180° C. and the resultant polyester polyol was discharged in a clean dry, nitrogen purged and blanketed steel container. 4000 g of polyester modifier was prepared. The maximum polymerization temperature was 280° C. The total time required for this polycondensation reaction was 16.6 hours.

This polyester has a theoretical functionality of 2.0 and an actual functionality of 2.1, a hydroxyl number of 65, and acid value of 2.9, a color Gardner of 4, a moisture content of 0.04%, a viscosity @ 120° C. of 300 cps and a glass transition temperature of −2° C.

Example 6

The reactor used to produce polyols of the present invention consisted of a 5000 ml flask provided with five tubular inlets and a supply of nitrogen. The reactor was also provided with a mechanical stirrer, a condenser, a packing column, a water trap, an overflow nitrogen bubbler and an overhead nitrogen bubbler.

A reaction mixture of 650.76 g (4.45 moles) of adipic acid, 233.04 g (1.74 moles) of dipropylene glycol, 385.3 g (2.67 moles) of cyclohexanedimethanol, 615.47 g (4.59 moles) of trimethylol propane, 2439.43 g (7.66 moles) of Pamite® 90 tall oil rosin and 100 ml of toluene was introduced into the reactor. The reaction mixture was kept under inert atmosphere (nitrogen), stirred, heated and nitrogen sparged (135 cc/minute). At 155° C., the toluene reflux started, the riser temperature was at 84° C., and the water of reaction was collected. The refractive index of the water was 1.3334 after 10 minutes of reaction. The reaction mixture was heated until the theoretical amount of the water of reaction was removed. The acid value of the resin and the refractive index of water were monitored every thirty minutes, until the acid value was below 15. The hydroxyl number was then measured. When the polyester polyol reached both the desired acid value and hydroxyl number, the toluene was stripped from the reaction mixture using a nitrogen sparging at a rate of 2 standard liter/minute (or vacuum strip) for 2 hours, until the concentration of toluene in solution was below 100 ppm. The reactor was cooled down to 180° C. and the resultant polyester polyol was discharged in a clean dry, nitrogen purged and blanketed steel container. 4000 g of polyester polyol was prepared. The maximum polymerization temperature was 260° C. The total time required for this polycondensation reaction was 14.8 hours.

This polyester polyol has a theoretical functionality of 1.35 and an actual functionality of 1.4, a hydroxyl number of 76, and acid value of 14.2, a color Gardner of 5, a moisture content of 0.04%, a viscosity @ 120° C. of 300 cps and a glass transition temperature of 0° C.

The following table provides a summary of the reactant molar ratios used to prepare the polyester polyols of Example 1–5

TABLE 1

Reactant Molar Ratios Used to prepare the polyester polyols of Examples 1–5.

| Example | Tall Oil Rosin Acid | Polyhydric Alcohol With Functionality Greater than About Two | Aliphatic Diol With Functionality Of About Two | Aliphatic Dicarboxylic Acid | Aromatic Dicarboxylic Acid |
|---|---|---|---|---|---|
| 1 | 0.444 | 0.333 | — | 0.223 | — |
| 2 | 0.222 | 0.222 | 0.222 | 0.112 | 0.222 |
| 3 | 0.400 | 0.400 | — | 0.063 | 0.137 |
| 4 | 0.222 | 0.112 | 0.333 | 0.333 | — |
| 5 | 0.222 | 0.222 | 0.223 | 0.333 | — |

Example 7

The reactive hot melt adhesive was produced in a double-planetary, stainless steel, Ross mixer (Ross LDM-1qt). The mixer had an electronically controlled variable speed drive, and the reactor was jacketed. The reactor had an integral thermocouple. A manifold was connected to the mixer head, which controls the nitrogen supply; the vacuum system and the isocyanate feed system to the reactor. The pot temperature was displayed on a digital readout attached to the reactor thermocouple. Silicone oil is heated and circulated through the jacket with a Polystat circulator from Cole-Palmer. The vacuum was generated with a single stage Welch vacuum pump; a dry ice trap was installed between the pump and the reactor. A Cole-Palmer Masterflex peristaltic pump using Tygone® tubing delivers the liquefied isocyanate component to the reactor.

Figure 1:
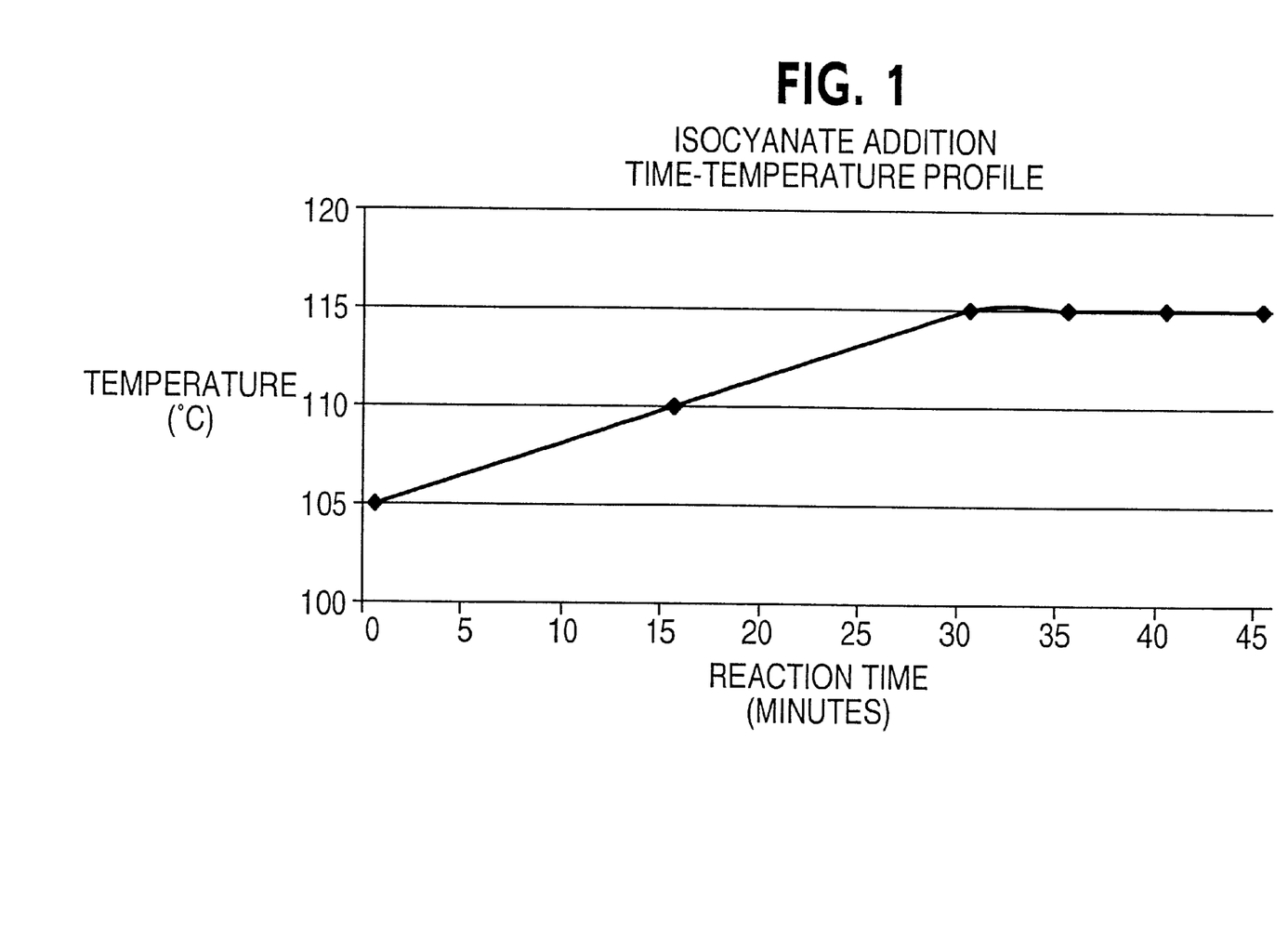
FIG. 1 is a graph representing reaction time versus temperature for isocyanate addition.

The polyol of example 6 was heated in a 100° C.–120° C. convection oven. 804.8 g (1.0903 number of equivalence) of the molten polyol was poured into the reactor, then 0.20 g of a silicone free air release agent (BYK A 500 air release agent available from Mallinckrodt Laboratory Chemicals, Phillipsburg, N.J.) . The reactor was installed on a mixer stand and heating oil lines were connected. The temperature controller of the oil circulator was set to 135° C. The reactor was then sealed and evacuated. When the polyol was completely molten, the mixture was agitated. Weigh 195 g (1.5600 number of equivalence) of an diisocyanate (LUPRANATE® M (PURE diphenyl methane diisocyanate, which contains 98% of 4,4'-diphenyl methane diisocyanate, available from BASF) into an isocyanate feed vessel. The vacuum on the reactor was broken with nitrogen. The temperature controller of the oil circulator was set to 70° C. melting the diisocyanate. The vessel was connected to the feed pump, and the diisocyanate was transferred to the reactor, while following the time—temperature curve (FIG. 1). The rate of addition of diisocyanate was 30 minutes. When the temperature reached 115° C., the temperature and agitation was maintained for 2 hours and 30 minutes. The material was sampled for % NCO. The oil temperature of the reactor was allowed to cool to 120° C. The total time required for the prepolymer reaction was 3 hours.

This reactive hot melt adhesive had a theoretical functionality of 1.4 and an actual functionality of 1.41. Its % NCO was equal to 1.97%, and its Brookfield viscosity @ 120° C. was equal to 49000 cps. The product had an isocyanate index of 1.43.

Example 8 (Comparative)

A polyurethane Rhma based on a highly crystalline high melting point (80° C.) polyester diol (Dynacoll® 7360 polyol obtained from Creanova Inc., Piscataway, N.J.) was reacted with a diisocyanate (LUPRANATE® M (PURE diphenyl methane diisocyanate, which contains 98% of 4,4'-diphenyl methane diisocyanate, available from BASF). The polyester polyol was melted in a 100° C.—120° C. convection oven. 981.43 g (0.5248 number of equivalence) of the polyester polyol was poured a reactor, then 0.22 g of a silicone free air release agent (BYK A 500 air release agent available from Mallinckrodt Laboratory Chemicals, Phillipsburg, N.J.) was added. The reactor was installed on a mixer stand and the heating oil lines were connected. The temperature controller of the oil circulator was set to 135° C. The reactor was then sealed and evacuated. When the polyester polyol was melted, the agitation was started. 132.34 g (1.0587 number of equivalence) of diisocyanate (LUPRANATE® M (PURE diphenyl methane diisocyanate, which contains 98% of 4,4'-diphenyl methane diisocyanate, available from BASF) was introduced into the isocyanate feed vessel. The vacuum on the reactor was broken with nitrogen. The temperature controller of the oil circulator was set to 70° C., then the diisocyanate was melted. The vessel was connected to a feed pump, and the diisocyanate was transferred to the reactor, while following the time—temperature curve (FIG. 1). The addition of diisocyanate was over 30 minutes. When the temperature reached 115° C., the temperature and agitation was maintained for 2 hours and 30 minutes. The material was sampled for %NCO and in view of the measured %NCO value of the material, an additional amount of diisocyanate was added to the material so that the %NCO approaches within approximately ±1% by weight of the theoretical %NCO, as calculated from the equivalent weights of the polyols and isocyanates used. The additional amount added was 6.6 grams. The oil temperature of the reactor was permitted to cool to 120° C. The total time required for that prepolymer reaction was 3 hours.

This reactive hot melt adhesive had a theoretical functionality of 2.0 and an actual functionality of 2.0. Its % NCO was equal to 2.01%, and its viscosity @ 120° C. was equal to 8000 cps. The product had an isocyanate index of 2.02.

Example 9

This is an example of polyurethane Rhma of the present invention. It is based on a highly crystalline, high melting point (80° C.) polyester diol (Dynacolle® 7360 polyol, obtained from Creanova Inc., Piscataway, N.J.). It is also based on a polyester polyol of the present invention (Example 1). Both polyols are reacted with diisocyanate (LUPRANATE® M (PURE diphenyl methane diisocyanate, which contains 98% of 4,4'-diphenyl methane diisocyanate, available from BASF). The Dynacoll® 7360 polyester polyol and the polyester polyol of Example 1 were melted in a 100° C.–120° C. convection oven. 669.30 9 (0.3579 number of equivalence) of the Dynacoll® 7360 polyester polyol was added to the reactor, then 200 g (0.2081 number of equivalence) of the polyester polyol of Example 1, and 0.22 g of a silicone free air release agent (BYK A 500 air release agent available from Mallinckrodt Laboratory Chemicals, Phillipsburg, N.J.) was added to the reactor. The reactor was installed on the mixer stand and connected to the heating oil lines. The temperature controller of the oil circulator was set to 135° C. The reactor was sealed and evacuated. When the polyester polyols were melted, the agitator was started. 130.50 g (1.0440 number of equivalence) of diisocyanate (LUPRANATE® M (PURE diphenyl methane diisocyanate, which contains 98% of 4,4'-diphenyl methane diisocyanate, available from BASF) was added into the isocyanate feed vessel. The vacuum on the reactor was broken with nitrogen. The temperature controller of the oil circulator was set to 70° C. and the diisocyanate was melted. The vessel was connected to the feed pump, and the diisocyanate was transferred to the reactor, while following the time—temperature curve (FIG. 1). The diisocyanate was added over 30 minutes. When the temperature reached 115° C., the temperature and agitation was maintained for 2 hours and 30 minutes. The material was sampled for %NCO and in view of the measured %NCO value of the material, an additional amount of diisocyanate was added to the material so that the %NCO approaches within approximately ±1% by weight of the theoretical %NCO, as calculated from the equivalent weights of the polyols and isocyanates used. The additional amount added was 3.5 grams. The oil temperature of the reactor was permitted to cool to 120° C. The total time required for that prepolymer reaction was 3 hours.

This reactive hot melt adhesive had a theoretical functionality of 2.0 and an actual functionality of 2.02. Its % NCO was equal to 2.01%, and its viscosity @ 120° C. was equal to 18300 cps. The product had an isocyanate index of 1.84.

Example 10 (Comparative)

A highly crystalline, high melting point (80° C.) polyester diol (Dynacolle 7360 obtained from Creanova Inc., Piscataway, N.J.) and a conventional reactive rosin glycerol ester modifier (Hercules Rosin glycerate, Permalyn™ 2085, hydroxyl number =41.2, glass transition temperature =45 degrees Centigrade and equivalent weight =133.6) were reacted with LUPRANATE® M (PURE diphenyl methane diisocyanate, which contains 98% of 4,4'-diphenyl methane diisocyanate, available from BASF). The Dynacoll® 7360 diol and the conventional reactive rosin glycerol ester modifier were melted in a 100° C.–120° C. convection oven. 728.62 g (0.3896 number of equivalence) of the Dynacoll® 7360 polyester polyol was poured into the reactor, then 215 g (0.1614 number of equivalence) of the conventional reactive rosin glycerol ester modifier was poured into the reactor along with 0.22 g of a silicone free air release agent (BYK A 500 air release agent available from Mallinckrodt Laboratory Chemicals, Phillipsburg, N.J.). The reactor was installed on a mixer stand and connected to heating oil lines. The temperature controller of the oil circulator was set to 135° C. The reactor was sealed and evacuated. When the polyester polyol and the rosin glycerol ester were melted, the agitation was started. 133.56 g (1.0685 number of equivalence) of diisocyanate (LUPRANATE® M (PURE diphenyl methane diisocyanate, which contains 98% of 4,4'-diphenyl methane diisocyanate, available from BASF) was added into the isocyanate feed vessel. The vacuum on the reactor was broken with nitrogen. The temperature controller of the oil circulator was set 70° C. then diisocyanate was melted. The vessel was connected to the feed pump, and the diisocyanate was transferred to the reactor, while following the time—temperature curve (FIG. 1). The of diisocyanate was over 30 minutes. When the temperature reached 115° C., the temperature was maintained and agitated for 2 hours and 30 minutes. The material was sampled for %NCO and in view of the measured %NCO value of the material, an additional amount of diisocyanate was added to the material so that the %NCO approaches within approximately ±1% by weight of the theoretical %NCO, as calculated from the equivalent weights of the polyols and isocyanates used. The additional amount added was 5.2 grams. The oil temperature of the reactor was permitted to cool to 120° C. The total time required for that prepolymer reaction was 3 hours.

This reactive hot melt adhesive had a theoretical functionality of 1.94 and an actual functionality of 1.94. Its % NCO was equal to 2.02%, and its viscosity @ 120° C. was equal to 11600 cps. The product had an isocyanate index of 1.94.

Example 11 (Comparative)

A highly crystalline, high melting point (80° C.) polyester diol (Dynacoll® 7360 diol obtained from Creanova Inc., Piscataway, N.J.) and on a highly crystalline polycaprolactone diol (CAPA™ 640 obtained from SOLVAY) were reacted with a diisocyanate (LUPRANATE® M, which contains 98% of 4,4'-diphenyl methane diisocyanate, available from BASF). The CAPA® 640 polycaprolactone diol and the Dynacoll® 7360 polyester polyol were melted in a 100° C.–120° C. convection oven. 692.20 g (0.3702 number of equivalence) of the Dynacoll® 7360 polyester polyol was added to the reactor, then 200 g (0.0143 number of equivalence) of the CAPA® 640 polycaprolactone diol, and 0.22 g of a silicone free air release agent (BYK A 500 air release agent available from Mallinckrodt Laboratory Chemicals, Phillipsburg, N.J. ). The reactor was installed on the mixer stand and connected to the heating oil lines. The temperature controller of the oil circulator was set to 135° C. The reactor was sealed and evacuated. When the polyols were melted, the agitation was started. 107.6 g (0.8608 number of equivalence) of diisocyanate (LUPRANATE® M, which contains 98% of 4,4'-diphenyl methane diisocyanate, available from BASF) was added into the isocyanate feed vessel. The vacuum on the reactor was broken with nitrogen. The temperature controller of the oil circulator was set to 70° C., which melts the diisocyanate. The vessel was connected to a feed pump and the diisocyanate was transferred to the reactor, while following the time—temperature curve (FIG. 1). The addition of diisocyanate was over 30 minutes. When the temperature reached 115° C., the temperature and agitation was maintained for 2 hours and 30 minutes. The material was sampled for %NCO.. The oil temperature of the reactor to was permitted to cool to 120° C. The total time required for that prepolymer reaction was 3 hours.

This reactive hot melt adhesive had a theoretical functionality of 2.00 and an actual functionality of 2.00. Its % NCO was equal to 2.00%, and its viscosity @ 120° C. was equal to 19600 cps. The product had an isocyanate index of 2.24.

Example 12

This is an example of a polyurethane Rhma of the present invention. This example was based on a highly crystalline, high melting point (80° C.) polyester diol (Dynacoll® 7360 diol obtained from Creanova Inc., Piscataway, N.J.)

It was also based on a polyester polyol of the present invention (Example 3) reacted with a diisocyanate (LUPRANATE® M, which contains 98% of 4,4'-diphenyl methane diisocyanate, available from BASF). The polyester diols were melted in a 100° C.–120° C. convection oven. 664.30 g (0.3552 number of equivalence) of the Dynacoll® 7360 polyester polyol was added to the reactor, then 200 g (0.2478 number of equivalence) of the polyester polyol of Example 3 and 0.22 g of a silicone free air release agent (BYK A 500 air release agent available from Mallinckrodt Laboratory Chemicals, Phillipsburg, N.J. ). The reactor was installed on the mixer stand and the heating oil lines were connected. The temperature controller of the oil circulator was set to 135° C. The reactor was sealed and evacuated. When the polyester polyols were melted, the agitation was started. 135.50 g (1.0840 number of equivalence) of diisocyanate (LUPRANATE® M, which contains 98% of 4,4'-diphenyl methane diisocyanate, available from BASF) into the isocyanate feed vessel. The vacuum on the reactor was broken with nitrogen. The temperature controller of the oil circulator was set to 70°, then the diisocyanate was melted. The vessel was connected to the feed pump, and the diisocyanate was transferred to the reactor, while following the time—temperature curve (FIG. 1). The addition of diisocyanate was over 30 minutes. When the temperature reached 115° C., the temperature and agitation was maintained for 2 hours and 30 minutes. The material was sampled for % NCO and in view of the measured %NCO value of the material, an additional amount of diisocyanate was added to the material so that the %NCO approaches within approximately ±1% by weight of the theoretical %NCO, as calculated from the equivalent weights of the polyols and isocyanates used. The additional amount added was 11 grams. The oil temperature of the reactor was permitted to cool to 120° C. The total time required for that prepolymer reaction was 3 hours.

This reactive hot melt adhesive had a theoretical functionality of 2.0 and an actual functionality of 2.02. Its % NCO was equal to 2.02%, and its viscosity @ 120° C. was equal to 21000 cps. The product had an isocyanate index of 1.80.

Example 13 (Comparative)

This is an example of a polyurethane Rhma based on a polyether diol (ARCOL® PPG-2025 polyol, obtained from ARCO Chemical Company.) The polyether polyol was reacted with a diisocyanate (LUPRANATE® M, which contains 98% of 4,4'-diphenyl methane diisocyanate, available from BASF). 875.18 g (0.8845 number of equivalence) of the ARCOL®PPG-2025 polyether polyol was added to the reactor, then 0.22 g of a silicone free air release agent (BYK A 500 air release agent available from Mallinckrodt Laboratory Chemicals, Phillipsburg, N.J. ) was added. The reactor was installed on the mixer stand and connected to the heating oil lines. The temperature controller of the oil circulator was set to 135° C. The reactor was sealed and agitation was started. 174.62 g (1.3969 number of equivalence) of diisocyanate was added into the isocyanate feed vessel. The vacuum on the reactor was broken with nitrogen. The temperature controller of the oil circulator was set to 700, then melting the diisocyantate. The isocyanate feed vessel was connected to a feed pump, and the diisocyanate was transferred to the reactor, while following the time—temperature curve (FIG. 1). The addition of diisocyanate was over 30 minutes. When the temperature reached 115° C., the temperature and agitation was maintained for 2 hours and 30 minutes. The material was sampled for %NCO.. The oil temperature of the reactor was permitted to cool to 120° C. The total time required for that prepolymer reaction was 3 hours.

This reactive hot melt adhesive had a theoretical functionality of 2.0 and an actual functionality of 2.0. Its % NCO was equal to 2.05%, and its viscosity @ 120° C. was equal to 474 cps. The product had an isocyanate index of 1.58.

Example 14

This is an example of a polyurethane Rhma of the present invention. It was based on a polyether diol (ARCOL®PPG-2025 polyol obtained from ARCO Chemical Company), and a polyester polyol of the present invention ( Example 1) reacted with a diisocyanate (LUPRANATE® M, which contains 98% of 4,4'-diphenyl methane diisocyanate, available from BASF). The polyester polyol of Example 1 was melted in a 100° C.–120° C. convection oven. 607.32 g (0.6138 number of equivalence) of the ARCOL®PPG-2025 polyether polyol was poured into the reactor, then 345 g (0.3590 number of equivalence) of the polyester polyol of Example 1 and then 0.22 g of a silicone free air release agent (BYK A 500 air release agent available from Mallinckrodt Laboratory Chemicals, Phillipsburg, N.J.) was introduced into the reactor. The reactor was installed on the mixer stand and the heating oil lines were connected. The temperature controller of the oil circulator was set to 135° C. The reactor was sealed and evacuated. When the polyester polyol of Example 1 was melted, the agitation was started. 197.46 g (1.5796 number of equivalence) of diisocyanate was introduced into the isocyanate feed vessel. The vacuum on the reactor was broken with nitrogen. The temperature controller of the oil circulator was set to 70° C. then melt the diisocyanate was melted. The isocyanate feed vessel was connected to the feed pump, and the diisocyanate was transferred to the reactor, while following the time—temperature curve (FIG. 1). The addition of diisocyanate was over 30 minutes. When the temperature reached 115° C., the temperature and agitation was maintained for 2 hours and 30 minutes. The material was sampled for %NCO.. The oil temperature of the reactor was permitted to cool to 120° C. The total time required for that prepolymer reaction was 3 hours.

This reactive hot melt adhesive had a theoretical functionality of 2.0 and an actual functionality of 2.02. Its % NCO was equal to 2.22%, and its viscosity @ 120° C. was equal to 2800 cps. The product had an isocyanate index of 1.62.

Example 15

Green Strength and Mechanical Properties of the Polyurethane Rhma

TABLE 2

| Example | Green Strength (minutes) | Tensile Strength (psi) | % Elongation at Break | Modulus |
|---|---|---|---|---|
| Comparative Example 8 | 1.50 | 2396 | 830 | 20868 |
| Example 9 | 3.5 | 3648 | 748 | 31086 |
| Comparative Example 10 | 4.25 | 2794 | 132 | 27251 |

Table 2 shows that the polyester polyols of this invention improve the mechanical properties of cured polyurethane reactive hot melt adhesives. In contrast, a conventional rosin glycerate modifier detrimentally decreases the mechanical properties of cured polyurethane reactive hot melt adhesives. In addition, the polyester polyols of this invention have a positive effect on mechanical properties while providing an acceptable time for the development of the uncured polyurethane reactive hot melt's green strength. Thus, the polyester polyols of this invention enable formulations showing an improved balance of application processing and cured mechanical properties relative to the current art.

TABLE 3

| | Peel Strength (pounds per linear inch) | | | | |
|---|---|---|---|---|---|
| Example | Polycarbonate | Aluminum | Steel | Stainless Steel | EPDM Rubber |
| Comparative Example 8 | 12.65 | 18.23 | 16.31 | 24.34 | 2.045 |
| Example 9 | 17.85 | Not Done | 18.75 | 22.69 | 1.543 |
| Comparative Example 10 | Not Done | 18.27 | 20.04 | 21.4 | Not Done |

Table 3 shows that the polyester polyols of this invention do not have a detrimental effect on the adhesive properties of cured polyurethane reactive hot melt formulations that are based on blends with conventional polyester diols, While Table 4 shows that the polyester polyols of this invention have a very beneficial effect on the adhesive properties of cured polyurethane reactive hot melt formulations that are based on blends with conventional polyether diols.

TABLE 4

| | Peel Strength (pounds per linear Inch) | | | | |
|---|---|---|---|---|---|
| Example | Polycarbonate | Aluminum | Steel | Stainless Steel | EPDM Rubber |
| Comparative Example 13 | 2.42 | 1.22 | 1.36 | 1.57 | 5.00 |
| Example 14 | 8.68 | 5.73 | 4.31 | 5.92 | 6.01 |

Example 16

Open Time of Uncured Polyurethane Rhma

Figure 2:
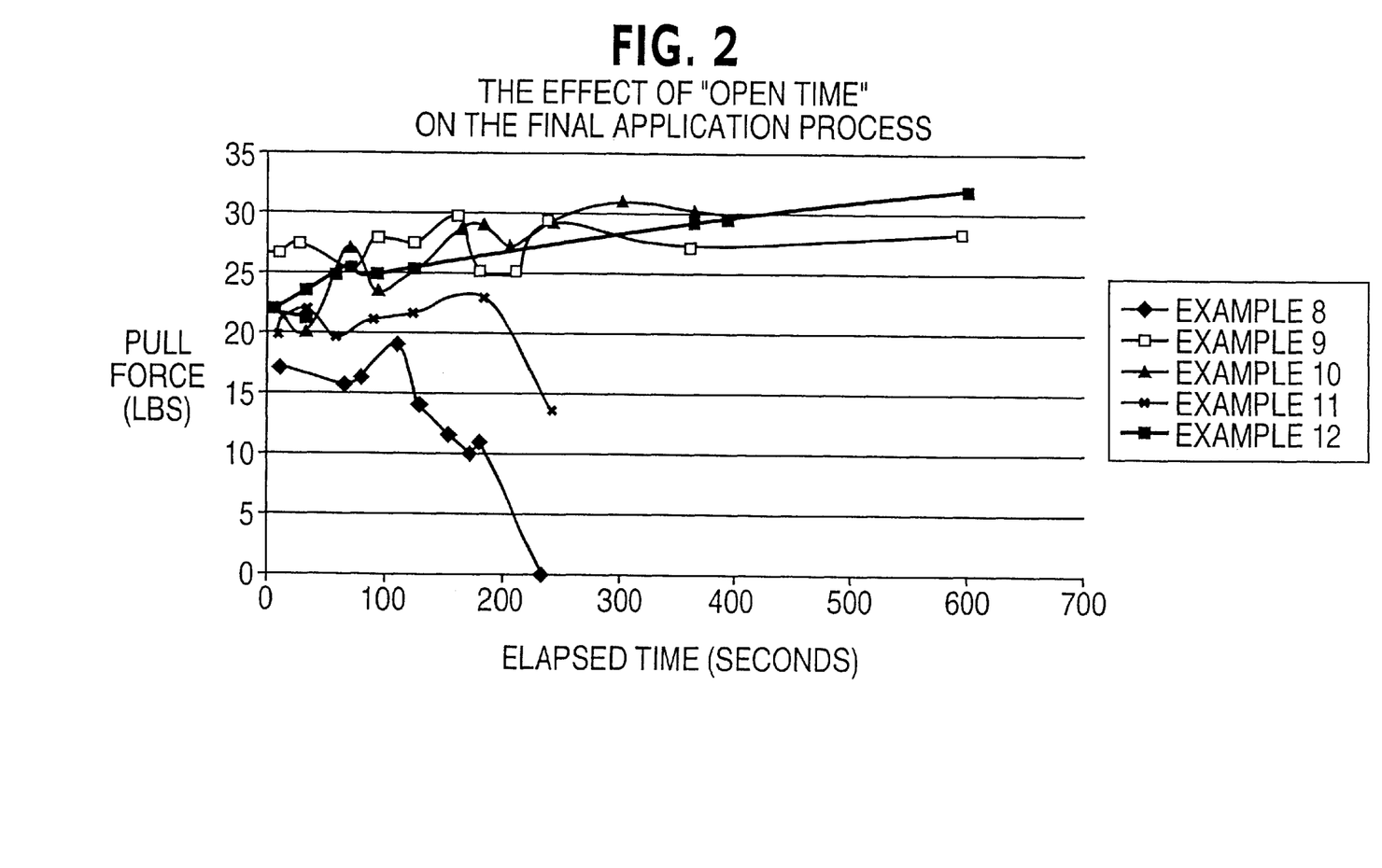
FIG. 2 is a graph representing the open time of the application process.
Figure 3:
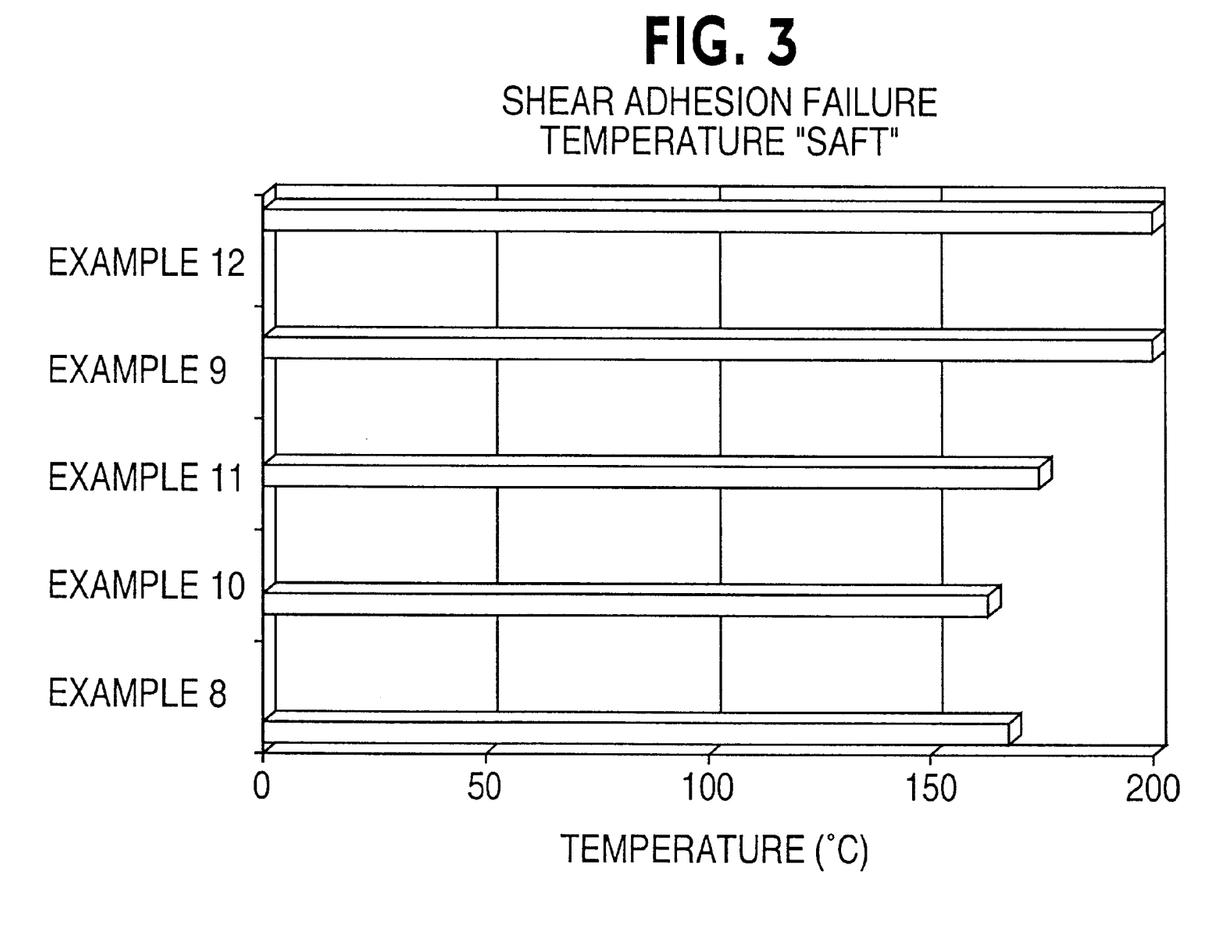
FIG. 3 is a bar graph representing the Shear Adhesion Failure Temperature (SAFT) of various adhesive formulations.

FIG. 2 shows the effect of the polyester polyols of the present invention on the uncured polyurethane Rhma's open time. The open times of Examples 9 and 12 are both greater than 600 seconds thus enabling the practicality of bonding large surfaces. In contrast, Comparative Example 8 has an open time no greater than 100 seconds and Comparative Example 11 has an open time no greater than 200 seconds. The open time of Comparative Example 10 is greater than 400 seconds but as shown in Table 2, this is obtained at the detriment of the mechanical properties of the cured polyurethane Rhma.

Example 17

Shear Adhesion Failure Temperature (SAFT) of Cured Polyurethane Rhma

The Shear Adhesion Failure Temperature (SAFT) was measured and it was surprisingly found that the polyester polyols of this invention provide cured polyurethane reactive hot melt adhesive formulations with exceptional SAFT as shown in Table 5.

TABLE 5

| Example | Shear Adhesion Failure Temperature (SAFT) |
|---|---|
| Example 9 | Greater than 200 degrees Centigrade |
| Example 12 | Greater than 200 degrees Centigrade |
| Comparative Example 8 | 167 degrees Centigrade |
| Comparative Example 10 | 160 degrees Centigrade |
| Comparative Example 11 | 175 degrees Centigrade |

It is not intended that the examples given here should be construed to limit the invention, but rather, they are submitted to illustrate some of the specific embodiments of the invention. Various modifications and variations of the present invention known to those of ordinary skill in the art can be made without departing from the scope of the invention. It is intended to cover all alternatives, modifications and equivalents as may be included within the scope of the invention as defined by the appended claims.

What is claimed is:

1. A polyester comprising:
   a reaction product of a polycarboxylic acid, a polyhydric alcohol with a hydroxy functionality of at least two, and a monocarboxylic acid, wherein
   the polyester formed therefrom has a theoretical hydroxy functionality within the range of about 0.1 to about 4.0,
   the polyester has an acid value below approximately 5,
   the polyester has a Brookfield viscosity at 120° C. ranging from about 100 cps to about 20,000 cps, and
   the polyester has a glass transition temperature within the range of about −20° C. to about +45° C., and
   wherein the monocarboxylic acid is a rosin acid.

2. The polyester of claim 1, wherein the polyhydric alcohol has a hydroxy functionality of greater than 3.

3. The polyester of claim 1, wherein the polyhydric alcohol selected from the group consisting of trimethylol propane and pentaerythritol.

4. The polyester of claim 1, wherein the polyhydric alcohol comprises trimethylol propane.

5. The polyester of claim 1, wherein the polyhydric alcohol comprises pentaerythritol.

6. The polyester of claim 1, wherein the polycarboxylic acid has a carboxylic acid functionality of about 2.

7. The polyester of claim 6, wherein the polycarboxylic acid is selected from the group consisting of adipic acid, isophthalic acid and phthalic acid.

8. The polyester of claim 6, wherein the polycarboxylic acid comprises adipic acid.

9. The polyester of claim 6, wherein the polycarboxylic acid comprises isophthalic acid.

10. The polyester of claim 6, wherein the polycarboxylic acid comprises phthalic acid.

11. The polyester of claim 1, wherein the rosin acid is selected from the group consisting of wood rosin, gum rosin, tall oil rosin, and mixtures thereof.

12. The polyester of claim 1, wherein the rosin acid comprises tall oil rosin.

13. The polyester of clam 1, wherein the polyhydric alcohol further comprises a combination of cyclohexane dimethanol and dipropylene glycol.

14. The polyester of claim 1, wherein the polyhydric alcohol comprises from about 5% to about 50% of total moles of reactants in the reaction product.

15. The polyester of claim 14, wherein the polyhydric alcohol comprises from about 10% to about 40% of total moles of reactants in the reaction product.

16. The polyester of claim 1, wherein the polycarboxylic acid comprises from about 5% to about 50% of total moles of reactants in the reaction product.

17. The polyester of claim 1, wherein the polycarboxylic acid comprises from about 5% to about 35% of total moles of reactants in the reaction product.

18. The polyester of claim 1, wherein the wherein the monofunctional carboxylic acid comprises from about 20% to about 45%, the polyhydric alcohol comprises from about 10% to about 40%, and the polycarboxylic acid comprises from about 5% to about 35% of total moles of reactants in the reaction product.

19. The polyester of claim 1, wherein the hydroxy functionality ranges from about 0.9 to about 2.1.

20. The polyester of claim 1, wherein the polyester has a glass transition temperature in the range of from about −15° C. to about +40° C. as determined by differential scanning calorimetry.

21. The polyester of claim 20, wherein the polyester has a glass transition temperature in the range of from about −10° C. to about +35° C. as determined by differential scanning calorimetry.

22. The polyester of claim 1, wherein the polyester has a Brookfield viscosity at 120° C. ranging from about 200 cps to about 10,000 cps.

23. A urethane polymer comprising a reaction product of:
   (i) a polyester comprising a reaction product of a polycarboxylic acid, a polyhydric alcohol with a hydroxy functionality of at least two, and a monocarboxylic acid wherein
   the polyester has a theoretical hydroxy functionality within the range of about 0.1 to about 4.0,
   the polyester has an acid value below approximately 5,
   the polyester has a Brookfield viscosity at 120° C. ranging from about 100 cps to about 20,000 cps, and
   the polyester has a glass transition temperature within the range of about −20° C. to about +45° C., and
   (ii) a polyfunctional isocyanate,
   wherein the resultant urethane polymer comprises an amount, by weight, of available isocyanate, which is from about 1.5% to about 2.5% by weight of the urethane polymer.

24. The urethane polymer of claim 23, wherein the amount of available isocyanate is about 2.0% by weight of the urethane polymer.

25. The urethane polymer of claim 23, further comprising an additional polyol.

26. The urethane polymer of claim 25, wherein the additional polyol comprises a polyester polyol.

27. The urethane polymer of claim 25, wherein the additional polyol comprises a polyether polyol.

28. The urethane polymer of claim 25, wherein the additional polyol has a hydroxy functionality of about 2.

29. The urethane polymer of claim 28, wherein the additional polyol comprises a polyester polyol.

30. The urethane polymer of claim 28, wherein the additional polyol comprises a polyether polyol.

31. The urethane polymer of claim 23, wherein the isocyanate comprises an aromatic isocyanate.

32. The urethane polymer of claim 31, wherein the aromatic isocyanate is selected from the group consisting of phenyl isocyanate, m-phenyl-diisocyanate, 2,4-toluene diisocyanate, 2,6-toluene diisocyanate and 4,4'-diphenyl methane diisocyanate.

33. The urethane polymer of claim 23, wherein the isocyanate comprises 4,4'-diphenyl methane diisocyanate.

34. A urethane polymer adhesive comprising a reaction product of:
(a) a polyester comprising a reaction product of a polycarboxylic acid, a polyhydric alcohol with a hydroxy functionality of at least two, and a monocarboxylic acid wherein
the polyester has a theoretical hydroxy functionality within the range of about 0.1 to about 4.0,
the polyester has a Brookfield viscosity at 120° C. ranging from about 100 cps to about 20,000 cps, and
the polyester has a glass transition temperature within the range of about −20° C. to about +45° C., and
(b) a polyfunctional isocyanate, wherein the urethane polymer comprises an amount, by weight, of available isocyanate and wherein the adhesive has a shear adhesion failure temperature ("SAFT") of greater than about −180° C.

35. The adhesive of claim 34, wherein the adhesive has a shear adhesion failure temperature failure temperature ("SAFT") of greater than about 190° C.

36. The adhesive of claim 34, wherein the adhesive has a shear adhesion failure temperature ("SAFT") of greater than 200° C.

37. The adhesive of claim 34, wherein the adhesive has a shear adhesion failure temperature ("SAFT") of greater than 200° C.

38. The adhesive of claim 34, wherein the adhesive has an open time of greater than about 300 seconds.

39. The adhesive of claim 34, wherein the adhesive has an open time of greater than about 400 seconds.

40. The adhesive of claim 34, wherein the adhesive has an open time of greater that about 600 seconds.

41. A method of use of an adhesive comprising:
(a) obtaining a urethane polymer adhesive comprising a reaction product of:
(i) a polyester comprising a reaction product of a polycarboxylic acid, a polyhydric alcohol with a hydroxy functionality of at least two, and a monocarboxylic acid wherein
the polyester has a theoretical hydroxy functionality within the range of about 0.1 to about 4.0,
the polyester has a Brookfield viscosity at 120° C. ranging from about 100 cps to about 20,000 cps, and
the polyester has a glass transition temperature within the range of about −20° C. to about +45° C., and
(ii) a polyfunctional isocyanate, wherein the urethane polymer comprises an amount, by weight, of available isocyanate and wherein the adhesive has a shear adhesion failure temperature ("SAFT") of greater than about 180° C., and
(b) applying the adhesive in an assembly operation, wherein the assembly operation is selected from the group consisting of carpet bonding, door panel assembly, instrument panel assembly, recreation vehicle assembly, over the road trailer assembly, heavy-duty truck assembly, window assembly, garage door assembly, structural insulated panel assembly, shoe sole assembly and non-wovens assembly.

42. The polyester of claim 1, wherein the polyester has a hydroxyl number of less than 76.

43. The urethane polymer of claim 23, wherein the polyester has a hydroxyl number of less than 76.

44. The urethane polymer adhesive of claim 34, wherein the polyester has a hydroxyl number of less than 76.

45. The method of claim 41, wherein the polyester has a hydroxyl number of less than 76.

46. The polyester of claim 1, wherein the polyester has an acid value below approximately 3.

47. The urethane polymer of claim 23, wherein the polyester has an acid value below approximately 3.

48. A polyester comprising:
a reaction product of a polycarboxylic acid, a polyhydric alcohol with a hydroxy functionality of at least two, and a monocarboxylic acid, wherein
the polyester formed therefrom has a theoretical hydroxy functionality within the range of about 0.1 to about 4.0,
the polyester has an acid value below approximately 5,
the polyester has a Brookfield viscosity at 120° C. ranging from about 100 cps to about 20,000 cps, and
the polyester has a glass transition temperature within the range of about −20° C. to about +45° C., and
wherein the monofunctional carboxylic acid comprises from about 20% to about 45% of total moles of reactants in the reaction product.

49. The polyester of claim 48, wherein the polyhydric alcohol comprises from about 10% to about 40%, and the polycarboxylic acid comprises from about 5% to about 35% of total moles of reactants in the reaction product.

* * * * *